Sept. 29, 1953          J. G. TRUESDELL                2,653,498
              TOOL FOR APPLYING WIRE HOSE CLAMPS
                AND MAKING OTHER WIRE CONNECTIONS
Filed Jan. 28, 1950                              2 Sheets-Sheet 1

*INVENTOR.*
John G. Truesdell
BY
Lampherr & Van Valkenburgh
ATTORNEYS

Sept. 29, 1953    J. G. TRUESDELL    2,653,498
TOOL FOR APPLYING WIRE HOSE CLAMPS
AND MAKING OTHER WIRE CONNECTIONS
Filed Jan. 28, 1950    2 Sheets-Sheet 2

*INVENTOR.*
John G. Truesdell
BY
*Lamphere + Van Valkenburgh*
ATTORNEYS

UNITED STATES PATENT OFFICE 2,653,498

TOOL FOR APPLYING WIRE HOSE CLAMPS AND MAKING OTHER WIRE CONNECTIONS

John G. Truesdell, Colorado Springs, Colo., assignor of one-half to Robert H. La Grange, Colorado Springs, Colo.

Application January 28, 1950, Serial No. 141,035

5 Claims. (Cl. 81—9.3)

This invention relates to wire tools, and more particularly to a tool for forming wire connections, such as for applying hose clamps, attaching parts of fences and the like together, and similar purposes.

In applying a hose clamp, which is normally used to attach the hose securely to a nipple, ferrule or the like, a length of wire may be passed around the hose at the point at which the clamp is to be produced. If both ends of the wire can be stretched tightly in opposite directions, the wire ends could be rotated about each other, or twisted together, to form a strong, tight clamp. However, the wire has previously been merely looped about the hose and the wire ends then twisted about each other, as by a pair of pliers or the like, which also does not permit a maximum twisting pressure on the wire. Thus, a maximum clamping pressure of the wire has not tended to be obtained nor has adequate twisting pressure on the wire been obtained, since sufficient torque cannot usually be produced.

Among the objects of the present invention are to provide a novel form of wire tool; to provide such a wire tool which is particularly adapted to be utilized in applying wire clamps on hose and the like; to provide such a wire tool which is also useful in forming wire clamps or attachments for securing together parts of wood or metal, such as wooden fences or metal pipes; to provide such a wire tool which permits a wire to be looped around a hose or the like, and the ends then pulled in opposite directions, with sufficient force to insure a strong tight joint; to provide such a wire tool which facilitates such pulling of wire ends in opposite directions, and which also facilitates the placement of the wire ends in the tool; to provide such a wire tool which, after the wire ends have been pulled in opposite directions, permits a maximum torque to be applied so as to twist the wire ends about each other; to provide such a wire tool which includes, in a single tool, a number of additional facilities, such as for cutting the wire, for clinching a twisted section of the wire, for hammering a twisted section, and the like.

Additional objects and the novel features of this invention will become apparent from the following description, taken in connection with the accompanying drawings in which.

Figure 1:
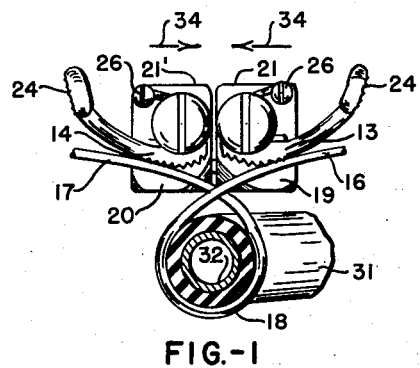
Fig. 1 is an end elevation of the tool of this invention, in one position in applying a wire clamp to a hose, the hose being shown in section and the wire engaging end of the tool being in closed position.
Figure 2:
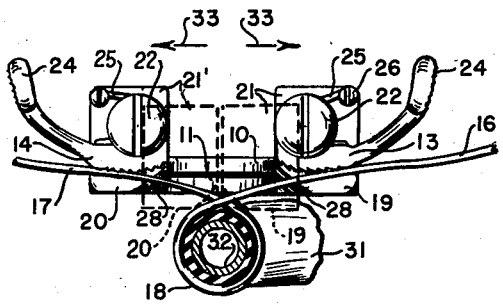
Fig. 2 is a similar end elevation, with the hose in section but with the wire engaging end of the tool in open position.
Figure 3:
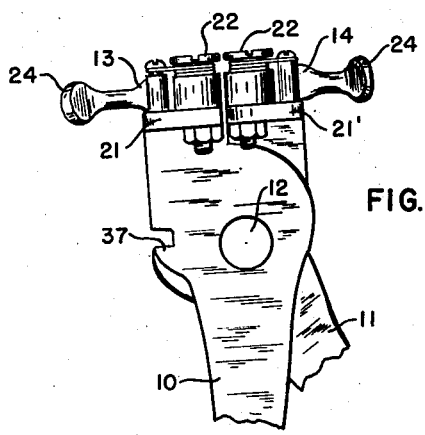
Fig. 3 is a partial top plan view of the tool of this invention, in the position of Fig. 1.
Figure 4:
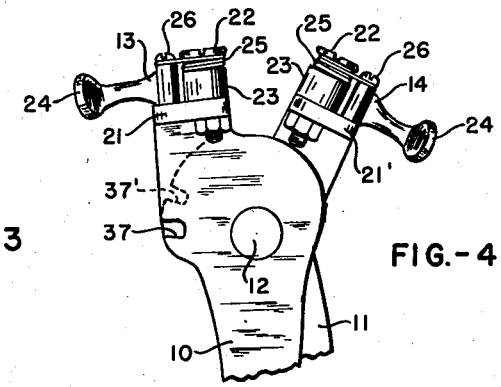
Fig. 4 is a similar partial top plan view, with the tool in the position of Fig. 2.

As illustrated in Figs. 1-4, the tool of this invention may comprise a pair of handles 10 and 11, pivoted adjacent one end about a pin 12. Each handle 10 and 11 extends past the pivot 12 to a wire clamp 13 and 14, respectively, each of which is preferably formed with a transversely grooved or serrated edge 15, as shown more clearly in Figs. 5–7, so as to clamp the end 16 or 17 of a length of wire 18 against a clamping surface of a guide 19 or 20, respectively. Guides 19 and 20 extend longitudinally from the ends of the respective handles but the clamping surfaces extend transversely thereof so as to receive the wire transversely, each of the handles being provided with a perpendicular flange or block 21 or 21' which are mirror images of each other, as are the clamps 13 and 14. The respective guides 19 and 20 may be formed integrally with the blocks 21 and 21', on which the respective clamps 13 and 14 are also mounted. Each clamp may be pivotally mounted on a pin 22, as by a barrel 23, and pins 22 may be removable, as when in the form of cap screws, as shown. Also, the serrated or grooved edge 15 of each clamp is preferably eccentric, such as being formed along a generally involute curve, so that it may be lifted by a handle 24, as in Fig. 7, to enable the wire to be released more readily, but will tend to engage the wire more firmly upon a pull on the wire. Each clamp may be pressed toward the guide by a spring 25, one end of which is attached to a post or pin 26 and the other end of which bears against the clamp 13 or 14, the remainder of the spring preferably being coiled around pin 22, as in Fig. 6.

Figure 5:
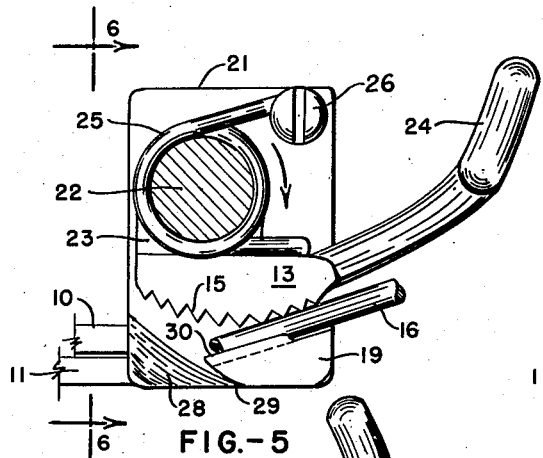
Fig. 5 is an enlarged end elevation of one of the wire engaging ends of the tool, certain parts being broken away to illustrate the construction more clearly.
Figure 6:
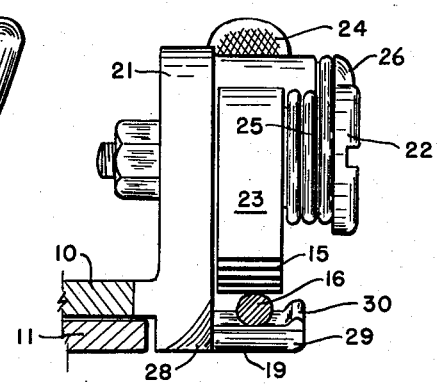
Fig. 6 is an enlarged longitudinal section taken along line 6—6 of Fig. 5.
Figure 7:
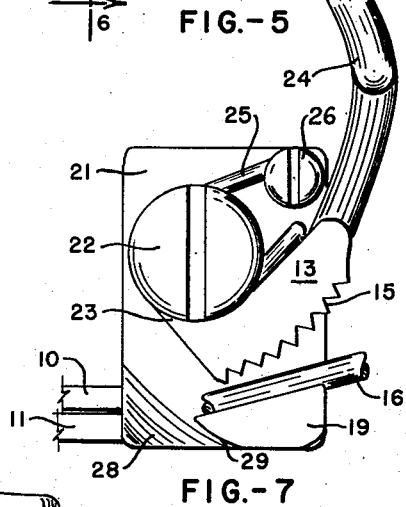
Fig. 7 is an enlarged end elevation similar to Fig. 5, but with a wire clamp in open position.

As in Figs. 5 to 7, the lower inside edge 28 of each flange or block 21 and 21' is cut away, as shown, and the inner edge of each guide 19 and 20 terminates short of the inside edge of the corresponding flange as well as the inner edge of the handle. Also, the underside 29 of each guide 19 and 20 is inclined upwardly toward the inner edge, as in Figs. 5 and 7, so as to accommodate the wire ends when extending in opposite directions across the guides, as in the dotted position of Fig. 2. In addition, each guide 19 and 20 is provided with an outer lip or flange 30, as in Fig. 6, so as to prevent the wire from slipping off the guide. As will be evident, the flange 30 extends transversely of the guides 19 and 20 and also may be considered to form a groove for reception of the wire, such groove also being the clamping surface of the guide.

As in Fig. 7, when the clamp 14—and similarly the clamp 13—is lifted by its handle 24, adequate space between the clamp and the guide is provided for insertion of a portion of the wire. However, when the handle 24 is released, the spring 25 will force the clamp down against the wire, as in the position of Fig. 5. When a wire clamp is to be applied to a hose, the wire is looped around the hose 31, into which a ferrule or nipple 32 has previously been inserted, as in the position of Fig. 1, and with the handles 10 and 11 in closed position, both clamp handles 24 are moved upwardly, as by the pressure of a thumb and finger of one hand of the user. The guides 19 and 20 are then slipped under the wire ends and the clamp handles 24 released. When the handles 10 and 11 of the tool are moved apart, to move the flanges 21 and 21' and the clamps and guides along with them, in the direction of the arrows 33 of Fig. 2, the wire ends 16 and 17 are moved apart and the length 18 of the wire is tightened around the hose 31. If, on the first stretch of the wire, the user feels that a sufficiently tight clamp will not be obtained, the handles 10 and 11 may be moved back to closed position, which moves the blocks 21 and 21' to closed position in the direction of arrows 34 of Fig. 1, i. e. to the dotted position of Fig. 2. Due to the eccentricity of the clamp edges 15, when the tool handles are moved toward each other, the wire ends 16 and 17 will tend to push the clamps 13 and 14 upwardly, permitting the wire ends to move between the clamps and guides, and thereby permitting a closer grip to be obtained on the wire. As will be evident from the dotted position of Fig. 2, when the tool is closed, the blocks 21 and 21' are able to meet or substantially meet, due principally to the clearance provided by the guides 19 and 20. Of course, when the tool is moved to the full position of Fig. 2, i. e. when the handles are moved outwardly again, the clamps will engage the wire and hold it against each of the guides, because when the wire tends to rotate the guides in the opposite direction, i. e., downwardly, the eccentricity of the guides causes a greater pressure to be exerted against the wire. Thus, the clamps may be moved into the center and then outwardly as many times as desired, until as tight a constriction of the wire on the hose 31 as desired is obtained.

Figure 8:
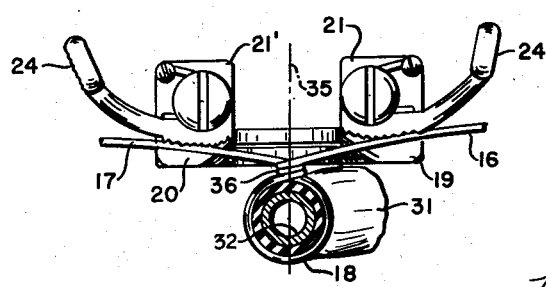
Fig. 8 is an end elevation similar to Fig. 2, but illustrating the configuration of the wire after twisting.

With the wire held tightly in stretched position, to lock the wire on to the hose, the tool may be rotated around the crossing point of the wire as an axis, i. e. in a plane perpendicular to the axis 35 of Fig. 8. The relatively long leverage provided by such position of the tool permits a considerably tighter twist to be obtained on the wire than in the case of a pair of pliers, for instance, whose handles are extending in the direction of the axis 35. One or more twists 36 may be placed in the wire, it being understood that the number shown in Fig. 8 is illustrative only, and that the number may vary from only one to as many as desired. After the wire is suitably locked by twisting, the clamp may be completed by cutting off the ends of the wire as closely as possible to the twist. For this purpose, handles 10 and 11 may be provided with cutting slots 37 and 37', respectively, as in Figs. 3 and 4, so that in the closed position of the tool, as in Fig. 3, the slots will coincide and a wire may be inserted therein, so that upon movement to the open position of Fig. 4, the wire will be severed by the cutting slots. The twist of the wire may be left standing or bent downwardly in a manner explained later.

Figure 9:
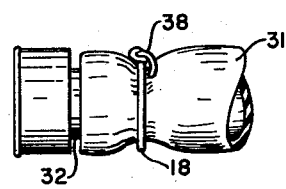
Fig. 9 is a side elevation of a wire clamp applied to a hose connection, by use of the tool of this invention.

Often, only a single complete twist of the wire is necessary to make the clamp secure, and such is the case of the hose clamp of Fig. 9. As will be evident, the wire ends may be cut off a short distance from the single twist 38 and the cut ends then bent over against the hose 31, alongside the wire 18, so that the wire ends will lie in the groove formed by compression of the hose, and therefore will not form protuberances tending to catch on objects and interfere with use of the hose.

Figure 10:
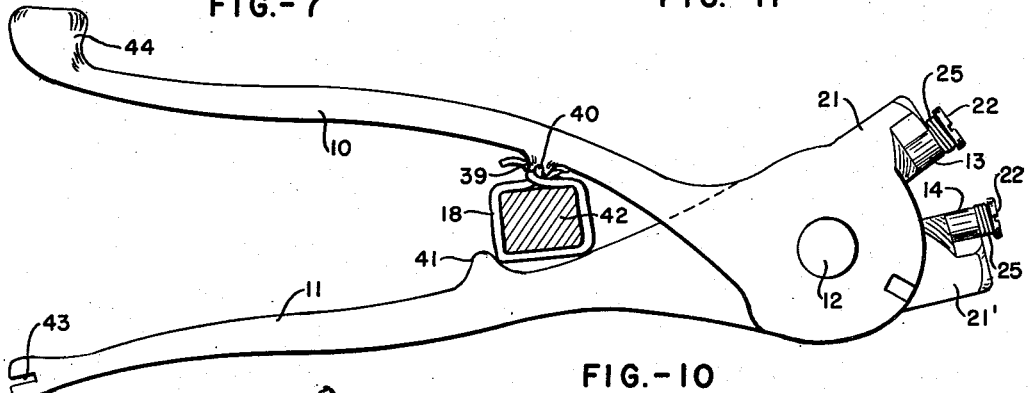
Fig. 10 is a bottom view of the tool of this invention, in partly open position for clinching a twisted portion of the wire.

The twist, or the free ends of the wire beyond the twist, may be bent into the groove formed by the wire clamped around a hose, or against any other member to be clamped, in the manner illustrated in Fig. 10. The handle 10 of the tool may be provided with a projection 39, disposed on the inside and having a groove 40 adapted to engage the end of the wire, or the end of the twist. A projection 41, on the inside of the opposite handle 11, but preferably spaced farther from the pivot pin 12, cooperates with the projection 39, in preventing a hose or other member, such as a square member 42, as in Fig. 10, from slipping between the handles during the bending of the twist or wire ends. Projections 39 and 41 also act as stops for the handles to space the blocks 21 and 21' the desired distance apart, in closed position. For bending the wire around a corner of a square, rectangular or otherwise angular member, or for any other desired purpose, the rear end of one of the handles, such as handle 11, may be slightly flattened and provided with a slot 43. Also, in instances wherein the member or members being clamped, such as a fence rail and post, are too large to fit between the handles, and therefore the wire end or twist cannot be bent down by the projections 39 and 41, a hammer head formed by an enlargement 44 at the rear end of one of the handles, such as handle 10, may be utilized. Enlargement 44 preferably extends outwardly from the handle, so that it will also serve as a stop, to prevent the hand of a user from slipping off the handle during use of the tool.

Figure 11:
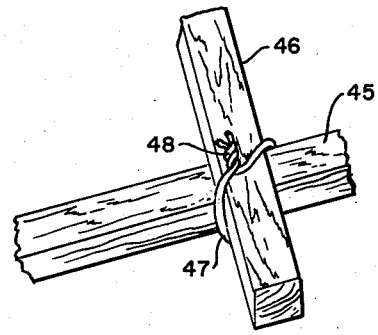
Fig. 11 is a fragmentary perspective view of a wire clamp applied to a pair of wood members, by use of the tool of this invention.

In utilizing the tool of this invention for applying a wire clamp to relatively large objects, such as in building a wooden fence, as in Fig. 11, a fence rail 45 may be attached to a fence post 46 merely by passing a length of wire 47 angularly around the rail and post, then inserting the wire ends between the guides 19 and 20 and the respective clamps, in the manner shown in Fig. 1. By moving the clamps apart, the wire may be tightened around the members to be clamped together, it being evident from Figs. 3 and 4 that the handles 10 and 11 are moved together to move the clamps apart. If on the first or any subsequent movement apart of the clamps, the wire is not tight enough, the handles 10 and 11 may be moved together again, whereupon the wire will slip between the clamps in the manner previously described, and a new grip, farther inwardly, obtained on the wire. When the wire is finally tightened around the members, the tool may be rotated in a plane perpendicular to the axis 35 of Fig. 8, to produce a twist 48 of Fig. 11. After the ends of the wire have been cut off, the hammer head enlargement 44 may be utilized in pounding the twist 48 flat against the post or rail, as the case may be. It will be understood, of course, that the relative size of the rail 45 and post 46 of Fig. 11 is considerably reduced, with respect to the size of wire 47 and twist 48, for purposes of illustration.

Figure 12:
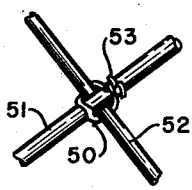
Fig. 12 is a fragmentary perspective view of a wire clamp applied to a pair of round members such as metal pipes, by use of the tool of this invention.

A pair of pipes, or other round members, such as concrete reinforcement bars, may be clamped together as by a length of wire 50 applied to pipes 51 and 52 of Fig. 12. Again, the members being attached, i. e. the pipes 51 and 52, are considerably reduced in relative size, in comparison with the wire 50, which may be bent around one of the pipes, such as pipe 51. Then, each of the ends may be brought around the other pipe 52 and then passed around and crossed on the opposite side of pipe 51. The wire 50 may then be tightened on both pipes by the tool, and after tightening a twist 53 produced, in the manner described previously. After the wire ends are cut off, twist 53, or both wire ends, may be bent down against pipe 51, as by using the projections 39 and 41 in the manner described previously, in case the pipes are not too large to be placed between the handles 10 and 11, or otherwise by hammering with the enlargement 44.

From the foregoing, it will be evident that the wire tool of this invention fulfills to a marked degree the requirements and objects hereinbefore set forth. As will be evident, the tool is particularly adapted to produce a tight and effective wire clamp on a hose, or on any other desired member. The provision of guides extending longitudinally with respect to the handles, enables the final twist of the wire to be made by rotating the tool in a plane perpendicular to the axis of the twist, which permits a considerably greater torque to be produced than if the handles were merely rotated about the plane of the axis and twisted. Also, the eccentric clamps provided with serrated edges, tend to grip the wire securely for stretching purposes, but also to permit the clamps to be moved inwardly along the wire ends, to obtain a new grip. The provision of outwardly and upwardly extending handles for the clamps enables the tool to be placed on the wire ends relatively easily, a factor to which the open space between the guides and the clamps, when the clamps are in the position of Fig. 7, for instance, also contributes. Grooved guides insure that the wires will not slip off the guides, during inward and outward movement of the handles, while the cut away lower inside edges of the blocks, on which the clamps are mounted, in combination with the upward inclination of the undersides of the guides, permits the wire engaging ends of the clamps to be moved close together to obtain a closer grip on the wire, and also permits the wire engaging end of the tool to approach more closely the object or objects on which the wire clamp is being placed. The provision of an outwardly or laterally extending enlargement, on one end of one handle, not only enables the enlargement to be used as a hammer, but also prevents the hand of the user from slipping off the handles, particularly when the wires are being twisted. In addition, cooperating projections on the inside of the handles, one of which is provided with a groove, permit the twist and/or wire ends to be readily bent down against the object, such as a hose, and is particularly of value when the object or objects are of relatively small size.

Depending upon the conditions to which the clamp is to be subjected, such as the weight of the members, the presence or absence of vibration and similar factors, the ends of the wire may be twisted about each other one or any desired number of times. The ends also may be cut off at the end of the twist, or some free end left. The free ends, or the twist, may be bent down against one of the members.

Although a specific embodiment of this invention has been described and illustrated, and several examples of wire clamps shown and described or indicated, it will be understood that a wire clamp may be applied in other situations, and that other and different embodiments of this invention may exist, and various changes made therein, all without departing from the spirit and scope thereof.

What is claimed is:

1. A tool for forming wire connections on the order of hose clamps and for attaching parts of fences and other pieces together, comprising a pair of longitudinal handles; a handle pin connecting said handles pivotally together adjacent the front end of each said handle; a transversely extending block mounted on or integral with the front end of each said handle, each said block extending from said handle in the same direction and in a direction substantially parallel to the axis of said handle pin, the inner corner of each said block being cut away adjacent said handle; a guide extending longitudinally from each said block and having a transverse flange at the extreme end providing a groove along one surface thereof adjacent said block, and the opposite surface of said guide being cut away on a slope at the inside, the inner edge of each said guide being spaced outwardly from the inner edge of each said block; a clamp pin extending in a direction substantially perpendicular to the axis of said handle pin and mounted on each said block in spaced relation to said guide; a clamp mounted on each said clamp pin for pivotal movement, each said clamp having a serrated lower edge having an increasing radius of curvature from the inside to the outside, said clamp having a manually engageable handle extending outwardly and each said clamp being adapted to hold a wire against the corresponding guide; and a spring bearing against said clamp and normally holding said clamp in engagement with said guide, said clamps being liftable by said handles to permit a portion of the wire to be passed between each guide and the corresponding clamp and said clamps being adapted to grip said wire portions during movement apart, but to permit said wire portions to slide thereunder during movement of said clamps in the direction toward each other.

2. A tool for forming wire connections on the order of hose clamps and for attaching parts of fences and other pieces together, comprising a pair of longitudinal handles; a handle pin connecting said handles pivotally together adjacent the front end of each said handle; a guide extending longitudinally from each said handle at the front end thereof, said guide having a transverse flange providing a groove along the upper surface thereof, and the inner edge of each said guide; and resilient means for normally holding each said clamp in engagement with the each said handle for pivotal movement about an axis substantially perpendicular to the axis of said handle pin, each said clamp having a serrated lower edge having an increasing radius of curvature from the inside to the outside, said clamp having a manually engageable handle extending outwardly and each said clamp being adapted to hold a wire against the corresponding guide; and resilient means for normally holding each said clamp in engagement with the corresponding guide, said clamps being liftable by said handles to permit a portion of the wire to be passed between each guide and the corresponding clamp and said clamps being adapted to grip said wire portions during movement apart, but to permit said wire portions to slide thereunder during movement of said clamps in the direction toward each other, and said tool being adapted to tighten a wire having crossed ends extending in opposite directions about one or more objects, and then to produce one or more twists in said wire by rotation of said handles in a plane generally perpendicular to the direction of the axis of said handle pivot pin.

3. A wire tool comprising a pair of handles; a pivot for said handles and connecting said handles adjacent one end thereof; a wire guide extending longitudinally from the end of each said handle and having a clamping surface disposed generally transversely to the axis of said handle pivot; a clamp on each said handle for clamping a portion of said wire against said guide clamping surface; and a pivot for each said clamp, the axis of each said clamp pivot extending transversely to the direction of the axis of said handle pivot.

4. A wire tool as defined in claim 3, wherein each said clamping surface is provided with a groove to receive said wire.

5. A wire tool as defined in claim 3, wherein said clamp pivots are disposed above said guides, and the front inner corner of each handle is cut away to the underside and each said guide is disposed generally outwardly from said cut-away portion.

JOHN G. TRUESDELL.

References Cited in the file of this patent

UNITED STATES PATENTS

| Number | Name | Date |
|---|---|---|
| 533,066 | Kent | Jan. 29, 1895 |
| 779,221 | Kennard | Jan. 3, 1905 |
| 1,004,309 | Swenson | Sept. 26, 1911 |
| 1,304,620 | Steinkoenig | May 27, 1919 |
| 1,351,598 | Wise | Aug. 31, 1920 |
| 1,376,597 | Wise | May 3, 1921 |
| 1,657,978 | St. Pierre | Jan. 31, 1928 |
| 1,698,474 | Friedl | Jan. 8, 1929 |

FOREIGN PATENTS

| Number | Country | Date |
|---|---|---|
| 82,100 | Switzerland | Sept. 1, 1919 |
| 772,067 | France | Aug. 6, 1934 |